US006117528A

United States Patent [19]

Hobson et al.

[11] Patent Number: 6,117,528

[45] Date of Patent: *Sep. 12, 2000

[54] OIL DELIVERY SHEET MATERIAL FOR USE IN VARIOUS PRINTER DEVICES

[75] Inventors: Alex R. Hobson, Elkton, Md.; Robert L. Sassa, Newark, Del.

[73] Assignee: W. L. Gore & Associates, Inc., Newark, Del.

[ * ] Notice: This patent is subject to a terminal disclaimer.

[21] Appl. No.: 09/303,918

[22] Filed: May 3, 1999

Related U.S. Application Data

[63] Continuation of application No. 08/868,925, Jun. 2, 1997, abandoned, which is a continuation of application No. 08/594,046, Jan. 30, 1996, Pat. No. 5,800,908, which is a continuation-in-part of application No. 08/485,533, Jun. 7, 1995, abandoned.

[51] Int. Cl.$^{7}$ .............................. B05C 1/06; B05C 1/08; B05C 11/00; B32B 7/14

[52] U.S. Cl. .......................... 428/198; 118/244; 118/249; 118/258; 118/260; 428/200; 428/308.1; 428/311.5; 428/422

[58] Field of Search .................................... 428/198, 200, 428/308.1, 311.5, 422; 118/244, 249, 258, 260, DIG. 5

[56] References Cited

U.S. PATENT DOCUMENTS

| | | | |
|---|---|---|---|
| 3,941,635 | 3/1976 | Tavelle et al. | 156/86 |
| 3,962,153 | 6/1976 | Gore | 260/2.5 R |
| 4,096,227 | 6/1978 | Gore | 264/210 R |
| 4,149,797 | 4/1979 | Imperial | 355/3 FU |
| 4,257,699 | 3/1981 | Lentz | 355/3 FU |
| 4,309,591 | 1/1982 | Kanoto et al. | 219/216 |
| 4,309,803 | 1/1982 | Blaszak | 29/130 |
| 4,324,482 | 4/1982 | Szlucha | 355/3 FU |
| 4,329,565 | 5/1982 | Namiki et al. | 219/216 |
| 4,372,246 | 2/1983 | Azar et al. | 118/60 |
| 4,522,866 | 6/1985 | Nishikawa et al. | 428/216 |
| 4,562,335 | 12/1985 | Katsuno et al. | 219/216 |
| 4,686,132 | 8/1987 | Sumii et al. | 428/171 |
| 4,796,046 | 1/1989 | Suzuki et al. | 355/3 FU |
| 4,862,221 | 8/1989 | Tabuchi et al. | 355/300 |
| 5,232,499 | 8/1993 | Kato et al. | 118/244 |
| 5,478,423 | 12/1995 | Sassa et al. | 156/187 |
| 5,800,908 | 9/1998 | Hobson et al. | 428/198 |

FOREIGN PATENT DOCUMENTS

| | | |
|---|---|---|
| 121010 | 2/1946 | Australia . |
| 0 165 719 | 12/1985 | European Pat. Off. . |
| 0 616 271 A2 | 9/1994 | European Pat. Off. . |
| 0 619 534 A2 | 10/1994 | European Pat. Off. . |
| WO93/08512 | 4/1993 | WIPO . |

*Primary Examiner*—Daniel Zirker

*Attorney, Agent, or Firm*—Carol A. Lewis White

[57] ABSTRACT

The present invention is an improved device for delivering a release agent to fuser rollers employed in various printer devices, such as laser printers, fax machines, copier machines, etc. The release agent delivery device of the present invention comprises an elongated web of microporous membrane (e.g., expanded polytetrafluoroethylene) bonded to a substrate, filled with release agent, and mounted between two shafts. The web spans across the fuser roller so that the roller is simultaneously cleaned and oiled during normal operation. When the portion of the web in contact with the fuser roller becomes contaminated or expends its release agent supply, the web can be advanced to place a fresh surface in contact with the fuser roller.

54 Claims, 8 Drawing Sheets

OIL DELIVERY SHEET MATERIAL FOR USE IN VARIOUS PRINTER DEVICES

RELATED APPLICATIONS

The present application is a continuation application of U.S. patent application Ser. No. 08/868,925 filed Jun. 2, 1997, now abandonded, which was a continuation of Ser. No. 08/594,046 filed Jan. 30, 1996, now U.S. Pat. No. 5,800,908, which issued Sep. 1, 1998, which was a continuation-in-part of U.S. patent application Ser. No. 08/485,533 filed Jun. 7, 1995, now abandoned.

BACKGROUND OF THE INVENTION

1. Field of the Invention

The present invention relates to an apparatus and method for supplying a release coating to a fixing roller or similar device, such as those commonly found in various printer devices.

2. Description of Related Art

Fuser technology is employed today in a wide variety of printer devices, such as plain paper copiers and fax machines, laser printers, etc. In these devices an image is formed by toner, typically a blend of thermal plastic, wax, metal oxide, and/or carbon, fixed to paper by passing it through a nip between a heated fixation roller and a pressure roller (herein sometimes referred to interchangeably or collectively as "fuser roller"). As the paper passes through the nip, toner facing the hot fixation roller melts and flows into the paper. This area of copiers and printers is typically referred to as the "fuser."

In order to prevent the toner from sticking to the fixation roller during fusing of the image, a release agent is typically applied to the fixation roller. Silicone oil (or dimethylsiloxane) is the release agent of choice in most copier and printer applications. However, amine, or mercapto functionalized silicone fluids, as well as hydrocarbons, natural oils, and water may be used as "release agents." The release agent is transferred to the paper during fusing and promotes the flow of the toner into the paper. When there is an inadequate amount of release agent on the fixation roller, the toner will become adhered to the fixation roller during the fusing process and can become deposited on subsequent pages or print, creating undesirable spots, which is referred to in the industry as "offsetting."

The trend in the non-impact printing industry is to produce images with higher resolution. This means that there are more dots per inch (DPI) on prints and copies. In order to achieve this finer resolution, the toner particle size must be smaller and this has led to some problems. With finer resolution particles, the standard amount of release agent is no longer acceptable and will in fact lead to pick up of smaller toner particles during the fusing process. It is therefore very important for good print quality that there be a substantial, consistent, and even layer of release agent on the fixation roller.

The release agent delivery device for current non-impact printers has to supply the appropriate amount of release agent consistently over the life of the part, and must be able to collect and hold any paper dust or offset toner. These two functions are critical to the proper functioning of the printer or copier. Many existing release agent delivery devices can usually provide one or the other function effectively, but all have deficiencies.

Aramid fiber (e.g., NOMEX®) release agent delivery devices have been used extensively in printers for many years. The devices come in a variety of geometries suited for the needs of various printer machines, including non-woven webs, and woven or felted stationary wicks. Unfortunately, NOMEX®—type fibers are coarse and do not have the ability to adequately control the rate of oil delivery. In many of the applications, the NOMEX® fibrous material is saturated with silicone oil and then pressed against the fixation roller. These devices deliver an inconsistent amount of oil and can be very abrasive on the fixation roller surface. In addition, NOMEX® fiber web materials come in many different forms, all of which have extremely high variations in density and thickness. These variations cause oiling irregularities and fluctuations that cannot be tolerated. Other problems with these forms of webs and stationary wicks include:

1) Decreasing oil delivery over the life as the oil drains out;

2) Oil leaking out in null periods, leading to high initial oil rates;

3) Pores clogging with dirt over time, which will adversely affect the oil delivery;

4) Building up of static electric charges when electrically insulative material is used;

5) Premature wearing of the fuser roller due to abrasive surface and high contact pressures;

6) Poor efficiency of oil transfer;

7) May require additional oil delivery apparatus, such as pumps or reservoirs; and 8) Settling or "puddling" of oil in the lower hemisphere of the roll upon null periods which leads to one half of a circumference length of low oil web and the other half of high oil, which may lead to poor image quality.

Other stationary oil delivery devices attempt to improve the oil delivery rate and reduce the abrasion of the NOMEX® by covering the NOMEX® felt with a protective cover, such as an expanded polytetrafluoroethylene (ePTFE) membrane. These devices have limitations in operating life and demonstrate significant inconsistencies in oil delivery over the operating life.

Significant improvement in performance has been achieved by applicants in stationary oiler designs by mounting oiling media into a tube of expanded polytetrafluoroethylene (PTFE). Such devices are described in U.S. Pat. No. 5,478,423, which issued on Jan. 26, 1995, and copending U.S. patent application Ser. No. 08/127,670.

Still another approach is to employ a rotational oiler device. One example is described in U.S. Pat. No. 5,232,499 to Kato et al. This approach solves some of the problems listed above but does not provide all of the needed characteristics. The oiler rotates against the fuser which eliminates most of the wear problems on the fuser, but this does not facilitate collection of offset toner and paper dust. Further, the oiler delivers the oil through diffusion, so the rates of delivery can be limited to very low amounts. Finally, the oiler still utilizes a reservoir which diminishes over the life of the part and still can lead to inconsistent oil delivery rates.

Oiling webs are a simple and effective way of addressing many of the problems discussed above. A web has oil self contained within it and therefore will deliver the oil consistently as the web is indexed to expose an unused portion of the web in contact with the fuser roller. In addition, the web has all of the oil contained within the pores of the material and therefore does not require a separate reservoir of oil which, depending on the configuration of the assembly, can be messy and difficult to meter. Webs tend to have superior cleaning ability because the collected toner and dirt is removed from the fuser roller with the taken up web material.

There have been a number of attempts to make an oil delivery web for copiers and printers that can meet all of the needed requirements. To date, however, all of the attempts have had shortcomings in one area or another.

One deficient approach to web design has been a composite web of aramid and thermoplastic blend nonwoven fabric. This web material has proven to be abrasive and to cause premature wearing of the fuser roller, which is typically coated with either silicone rubber or fluoropolymer. Further, aramid and thermoplastic web material can only hold a very small fraction of oil in its matrix. Typical oil holding capacities are approximately 30 to 50%. Also, the material has limited control of oil delivery due to the relatively inconsistent and overly large void spaces within the material. The material often has large variations in density and thickness (i.e., about 10% or more in both). Further, the material has high in-plane oiling, which results in inconsistent oil delivery rates and less than complete oil delivery. Typically, an aramid web delivers only about half of the oil contained within it (which starts off at only about 30–50% of the volume of the material). This is a waste of oil and requires more web to be used for a given life expectancy of oil delivery.

Another web material described in PCT/GB92/01958 utilizes a porous polytetrafluoroethylene. This material is a non-expanded PTFE material and comprises particles of PTFE that are sintered together to form a coherent matrix of particles and voids. This isotropic material has relatively large pore sizes and exhibits homogeneous wicking properties in the through direction and the plane direction. This homogeneity limits the control of the oil delivery and prevents the material from having complete oil delivery. Additionally, the larger pore size means that low viscosity oil will not be retained within the pores. In some applications, extremely thin oils are required, down to approximately 50 cst, which is too thin to be held within this material.

Another problem is that sintered PTFE material such as that disclosed in PCT/GB92/01958 is brittle and, thus, has to be relatively thick to avoid breakage in use. Where space constraints are a problem, the necessary thickness of the material means that less material can be used due to space constraints. Typically, the material is 0.010" (0.25 mm) thick or thicker in order to provide enough structural integrity for a web application. This material is suitable for some applications, but in no way addresses all of the demands for printer applications, especially those applications in which a lot of release agent is necessary. Furthermore, the sintered PTFE particle material has extremely low elongation, which causes it to prematurely crack, break or tear in applications if the stress applied is too high.

Accordingly, it is a primary purpose of the present invention to provide an apparatus for applying release chemicals to a roller, belt, or mating surface which is durable, delivers a consistent coating of chemical to the fuser, and provides effective cleaning of the fuser roller and high efficiency (oil transfer).

These and other purposes of the present invention will become apparent by the following specification.

SUMMARY OF THE INVENTION

The present invention provides an improved release agent delivery device for use in a variety of printers, including laser printers, plain paper copiers and facsimile machines, etc. The present invention utilizes the unique properties of a microporous membrane (such as expanded polytetrafluoroethylene (ePTFE) or polyolefin) as the release agent holding and delivering medium.

The web apparatus of the present invention comprises a layer of microporous membrane bonded to a backing material, such as a plastic film or fabric. The microporous membrane is filled with release agent and is bonded to an indexing mechanism which moves the web material across a fuser apparatus, in order to bring sequential portions of unused web material in contact with the fuser over the life of the web. Preferably, the web is attached to two shafts, with the web material initially wound around a payoff shaft to form a cylindrical roller of web material that can be indexed across the fuser roller. After an exposed portion of the web has become contaminated and depleted of oil, the web is then advanced to expose fresh web material to the fuser roller and move the contaminated web material onto a take-up roller. In most applications an elastomeric roller is used to press the web material against the fuser to ensure proper contact and to provide some pressure for cleaning offset toner and other contamination from the fuser roller.

As the web indexes, the oil contained within the microporous membrane will wick out and onto the fuser roller. The microporous membrane allows the oil to come out of the material evenly and completely. The rate of indexing is set to ensure proper oil delivery to the fuser. In null periods or when the copier or printer is not in use, the web in some cases is kept in contact and under pressure with the fuser. In instances where an ePTFE microporous membrane is employed, the microporous membrane oiling web will not over-oil, because the ePTFE membrane has very low wicking within the plane of the material. Therefore, excess oil delivery is eliminated.

The release agent delivery web of the present invention provides a greatly improved consistent rate of oil delivery. Whereas previous oiling webs made from materials such as NOMEX® felt can deliver oil only at a rate of about 0.2 to 0.4 mg/page, the release agent delivery web of the present invention can deliver release agent at a consistent rate in excess of 0.5 mg/page.

The microporous membrane oiling web of the present invention has much higher oil holding capacity than the current technologies, and will transfer the oil more completely than conventional technology. The web is therefore more environmentally sound and contributes less waste in use.

The preferred ePTFE web of the present invention delivers the oil very consistently due to the microporous nature of the ePTFE, and its anisotropic wicking properties. The web can be made much thinner than conventional oiling webs because of its high oil holding and delivery capacities, which saves space and allows a given volume of ePTFE oiling web material to last much longer than conventional web materials. Also, filler can be utilized with the ePTFE to alter the chemical, thermal or electrical properties of the material. Finally, the ePTFE oiling web material is low friction, which extends the life of the fuser roller.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved apparatus for use in delivering a chemical agent to a roller. The apparatus of the present invention is particularly applicable to the delivery of a release agent, such as silicone oil, to a fixation roller, pressure roller, or image transfer belt or roller of a laser printer, plain paper copier, or a fax machine, or similar device. For simplicity, such devices are collectively referred to herein as "printers," the rollers located in the fuser section of the printer are referred to as "fuser rollers," and the surfaces in general requiring oiling with a release agent are referred to as "contact surfaces."

Figure 1:
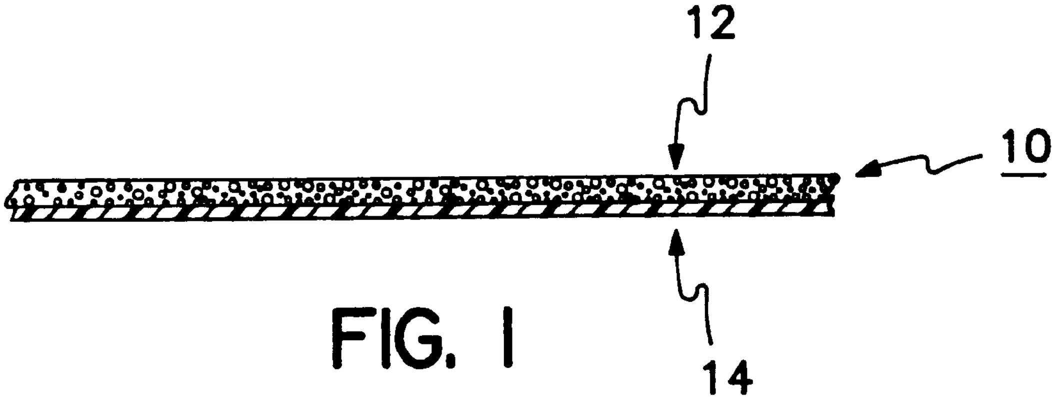
FIG. 1 is a cross-section view of the web material of the present invention.

As is shown in FIG. 1, one embodiment of an oiling web 10 of the present invention comprises a microporous membrane layer 12 bonded to a substrate 14. In some cases the ePTFE membrane can be used without a substrate. The term "microporous membrane" as used in the present application is intended to mean a continuous sheet of material that is at least 50% porous (i.e., it has a pore volume of ≧50%) with 50% or more of the pores being no more than about 5 μm in nominal diameter.

The novel release agent delivery devices of the present invention provide a greatly improved consistent rate of oil delivery. The rate of oil delivery and delivery efficiency are calculated over at least a 1000 page test run. The delivery efficiency is determined by averaging the oil per page values from Inductively Coupled Plasma-Atomic Emission Spectroscopy (ICP-AES) analysis during the run and using the average value obtained to determine the amount of oil extracted from the web. The oil delivered, or extracted, is divided by the amount of oil in the section of web tested, and that number is multiplied by 100 to give the percent delivery efficiency. A consistent rate is one which is greater than at least 50%. In addition, a further requirement for the rate to be consistent is that the material being tested should exhibit no oil drippage. This test is carried out by suspending a 3" (76 mm) square sample in an oven at 140° C. for 24 hours. A successful test is one where no oil drippage or weight loss is observed over this time.

The novel materials of the present invention can deliver release agent at a consistent rate in an amount of about 0.5 mg/page or greater, preferably from about 0.5 mg/page up to about 5 mg/page. Oil delivery in even greater amounts, such as about 8 mg/page or greater have also been measured.

In cases where a substrate is necessary due to, for example, the high tensile forces, the substrate material can be any number of materials, such as films or fabrics. Film substrate materials may be a polyester, polyamide, polyimide, polyetherpolyimide, polyethylene naphthalate (PEN), polytetrafluoroethylene (PTFE), perfluoroalkoxy (PFA), fluorinated ethylene propylene (FEP), or the like, depending on what is needed in the particular application. Fabric substrate materials may be nonwoven, such as a spunbonded, wet-laid, melt blown or felted polyester, nylon, polypropylene, aramid, or may be light woven material of polyester, nylon, polypropylene, aramid, PTFE, FEP, PFA, or the like. The substrate material is chosen to meet the specifications of the system, such as heat, mechanical, and chemical compatibility requirements.

The microporous membrane material of the web of the present invention can be made from one of several microporous materials, including expanded polytetrafluoroethylene (ePTFE) and porous polyolefin (e.g., polypropylene). Preferably, the microporous membrane comprises an ePTFE membrane including an expanded network of polymeric nodes and fibrils made in accordance with the teachings of the U.S. Pat. Nos. 3,953,566, 3,962,153, 4,096,227, and 4,187,390, all specifically incorporated herein in their entireties by reference. This material is commercially available in a variety of forms from W. L. Gore & Associates, Inc., of Elkton, Md., under the trademark GORE-TEX®.

Preferably, the ePTFE membrane of the present invention is made by blending PTFE fine particle dispersion, such as that available from E. I. duPont de Nemours & Company, Wilmington, Del., with hydrocarbon mineral spirits. The lubricated PTFE is compacted and ram extruded through a die to form a tape. The tape can then be rolled down to a desired thickness using calendering rollers and subsequently dried by passing the tape over heated drying drums. The dried tape can then be expanded both longitudinally and transversely at elevated temperatures above the glass transition temperature of the PTFE (greater than 300° C.), at a high rate of expansion, e.g., approximately 100 to 10,000% per second. Moreover, depending on the desired application, one or more fillers may be incorporated with the ePTFE to alter the chemical, thermal or electrical properties of the material.

The ePTFE membrane employed in the present invention, should have the following properties: a thickness of about 0.0005" (0.0127 mm) to 0.125" (3.175 mm); a porosity of about 30 to 98%; and a bubble point (with isopropyl alcohol) of 0.4 to 60 psi (0.03 to 4.2 kg/cm$^2$). The preferred ePTFE membrane properties are: a thickness of about 0.0254 mm to 0.381 mm; a porosity of about 70 to 95%; and a bubble point of about 1.0 to 30 psi (0.07 to 2.1 kg/cm$^2$), with the most preferable being from 2.0 to 20 psi (0.14 to 1.4 kg/cm$^2$).

The Bubble Point of porous PTFE is measured using a method similar to that set forth in ASTM Standard F316-86, incorporated by reference, with the following modifications: isopropyl alcohol is used instead of denatured alcohol; and area tested is about 10 mm diameter (78.5 $mm^2$). The Bubble Point is the pressure of air required to blow the first continuous bubbles detectable by the their rise through a layer of isopropyl alcohol covering the PTFE media.

Figure 2:
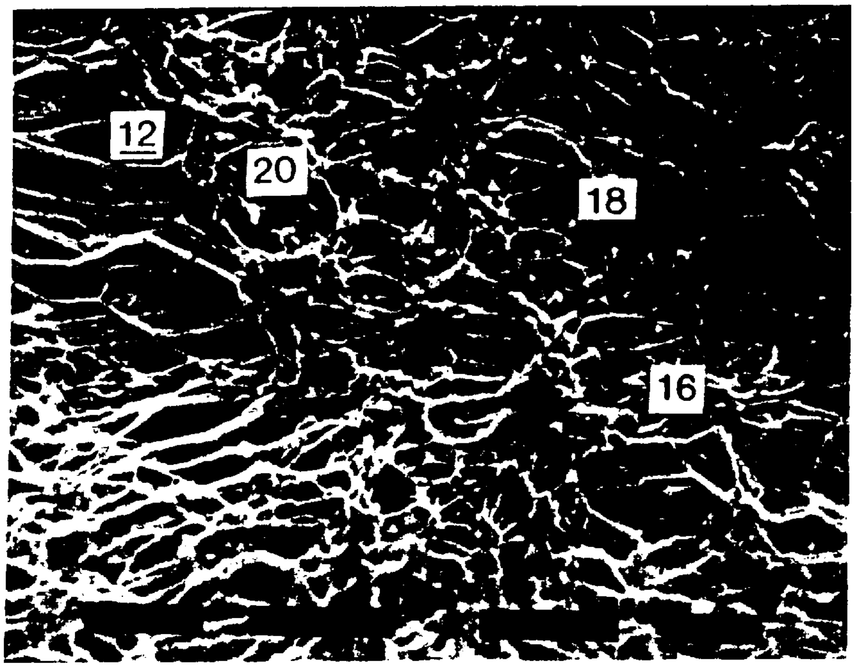
FIG. 2 is a scanning electron micrograph (SEM) of ePTFE material used in the web of the present invention, enlarged 5,000 times.
Figure 3:
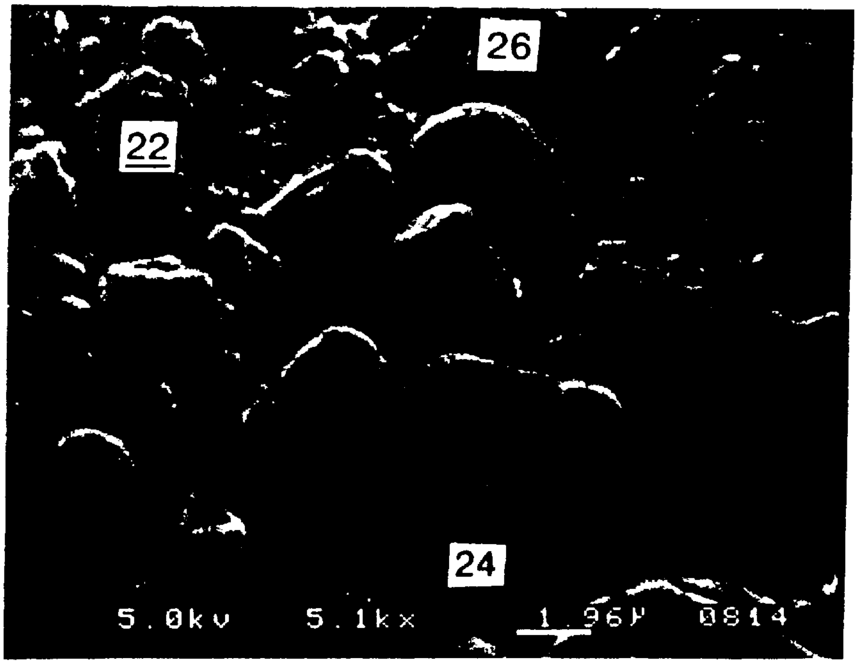
FIG. 3 is a SEM of a sintered PTFE material, enlarged 5,100 times.

The resulting expanded PTFE product is illustrated in FIG. 2. This ePTFE material 12 comprises polymeric nodes 16 interconnected by polymeric fibrils 18. Microscopic pores 20 are left between the nodes and fibrils that can be employed in the present invention. This structure is explained in greater detail below. By contrast, as shown in FIG. 3, prior PTFE web materials 22 were typically formed from sintered or full density PTFE particles 24 packed together to form a sheet. This construction has limited strength and limited pore space 26 available for oil retention.

Figure 5:
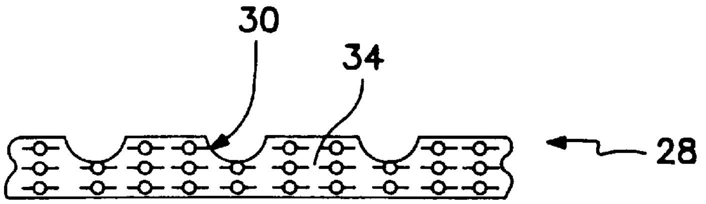
FIG. 5 is an enlarged cross-section view of ePTFE used in the present invention having a densified pattern therein.
Figure 6:
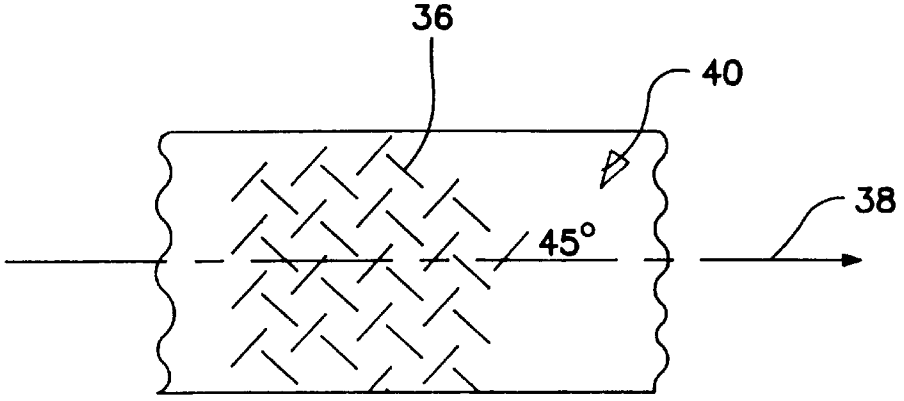
FIG. 6 is a top plan view of the ePTFE membrane used in the present invention with a densified pattern.

Further processing of the ePTFE membrane can provide even better offset toner and dirt holding capacity. As is shown in FIG. 5, an ePTFE layer 28 is shown with densified regions 30 forming grooves therein. These densified regions form a pattern between operating surfaces 34 on ePTFE layer 28. The pattern can be imparted into the ePTFE membrane using a number of techniques. One method of producing this pattern is through densification of the fluoropolymer in specific areas. For example, densification of a pattern can be achieved by imparting high pressure with high temperature to localized areas. This may be done by passing the membrane through a heated nip in which at least one of the heated rollers has selectively raised sections. Alternatively, the pattern may be imparted into the material by passing the ePTFE membrane through a heated nip with a material which has a pattern within it, such as a fabric or a wire cloth. One exemplary method of imparting a pattern into the ePTFE membrane is through the use of ultrasonic embossing. The ePTFE membrane can be passed through a rotating embossed metal roller, and a stationary or rotating ultrasonic horn, such as that available from Sonobond Ultrasonics, West Chester, Pa. The metal roller is pressed down onto the ePTFE membrane as it passes through the nip. The web speed, the pressure, and the amplitude of the ultrasonic horn can all be adjusted to produce the desired pattern. The formation of the ePTFE membrane pattern with ultrasonics provides regions that are thermally fused and crushed under pressure. These regions will not re-expand under stress. The areas around the densified regions using ultrasonic embossing will be, for the most part, unchanged. The preferred pattern is dependent on the application and the amount of toner pick up that is necessary. The preferred pattern shown in FIG. 6, comprising a discontinuous knurled pattern 36, with the axis of the densified elements at approximately a 45° angle to the direction of travel 38 of the web 40.

An expanded PTFE membrane is preferable as an oil holding and delivery web material for a variety of reasons. First, the chemical inertness and relatively high heat resistance of PTFE makes it desirable for use in the fuser section of printers in which the typical temperature is 160–220° C. In general, fuser oiling devices must have good resistance to oil chemistry and high heat. Furthermore, the release agent materials used in printers may be changed in the future to oils and agents that may be more reactive, or contain functional groups such as mercapto or amine. An ePTFE oiling web will not be affected by the changing chemistries, even at elevated temperatures.

Second, the ePTFE membrane provides an even distribution and consistent delivery of the release agent. In fact, the rate of distribution of release agent can be tightly controlled by adjusting one or more of a number of different properties. For instance, dimensions, porosity, equivalent pore size and other properties of the expanded PTFE membrane may be modified to provide specific properties. Moreover, the pattern formed on the membrane may be varied, for example, in degree of densification, depth, and amount of surface area densified. All of these factors can be controlled to provide required amounts and uniform dissemination of the release agent to the fuser.

Third, ePTFE has a low coefficient of friction and exceptional wear characteristics, reducing wear on component parts and extending operational life of the apparatus. Fourth, the ePTFE can be readily cleaned of deposited toner and other contaminates, which may be necessary for refurbishment of the oiling webs.

Fifth, the ePTFE can hold extremely high amounts of oil in its microporous structure. The ePTFE membrane can hold up to 95% oil (or 0.95 cc oil per 1.0 cc of ePTFE membrane). Depending on the porosity of the ePTFE membrane, the oil holding capacity of the membrane may be adjusted from 0.35 cc of oil/cc of ePTFE to 0.95 cc of oil/cc of ePTFE, with the preferred being 0.55 to 0.87 cc of oil/cc (or 55 to 87%) of ePTFE.

Equally important, the ePTFE can deliver the majority of the oil from its pores, typically delivering from 80 to 90% of the oil contained in its pores. In fact, testing has shown that oil delivery can be as high as 98%. As a result, the structure can be much thinner than other comparable oiling materials while leaving little wasted oil within the pores of the structure.

Sixth, the ePTFE membrane has anisotropic properties which are extremely well suited for oiling web applications. The ePTFE membrane can be constructed to have excellent wicking characteristics in the thickness of the material and typically resists wicking properties in the plane of the material. As is shown in FIG. 2, by aligning nodes 16, fibrils 18, and pores 20 of the ePTFE parallel with the thickness of the material, oil within a thickness of the web will only be delivered to the fuser when in contact with the fuser and will not wick from the payoff end of the web. In addition, migration of oil from the payoff side to the takeup side, which wastes oil and can cause contamination problems, is minimized.

Seventh, the ePTFE can be made extremely thin, down to 0.0005" (0.0127 mm), and still be strong, with a matrix tensile strength of about 10,000 to 20,000 psi (703 to 1406 $kg/cm^2$). Because the ePTFE membrane is so thin and extremely microporous, long lengths of web material can be rolled onto a core and kept within the space constraints of the system. This means that for a given indexing speed, the web will last much longer than conventional web materials. This saves on time to replace old webs and reduces errors that can result when an oiling device ceases to function properly.

The preferred method of construction of the web of the present invention bonds the expanded PTFE to a substrate material in order to increase strength and structural integrity of the web. For example, the ePTFE may be bonded to a solid, liquid impermeable, film. The ePTFE membrane can be bonded to the substrate using any number of standard industrial techniques, depending on what is chosen as the substrate. If the substrate is a thermoplastic, the ePTFE may be bonded by passing the ePTFE and the thermoplastic layer through a heated nip with the ePTFE against the heated roller. The thermoplastic will melt and flow into the ePTFE membrane forming a mechanical bond.

If a thermoset material is used as the substrate, the ePTFE membrane may be bonded to it using a suitable adhesive, such as silicone, pressure sensitive adhesive, acrylic, polyester, nylon, epoxy, and the like. The adhesive may be provided to the substrate and the ePTFE membrane in any desirable manner and/or configuration depending on, for example, the composition of the material to be bonded, etc. In one preferred embodiment, the adhesive may be provided in a discontinuous pattern between the surfaces to be joined, thereby minimizing any thermal expansion or shrinkage between and/or within the bonded layers.

After the ePTFE membrane is bonded to the substrate material, the release agent is added to the membrane. The release agent can be added to the membrane through a variety of techniques. One method of application is by soaking the web material in a bath of the fluid. Over time, the voids of the ePTFE will be filled with the fluid through capillary action. After the pores of the ePTFE are filled to a desired amount, the web may be pulled out of the fluid and the excess fluid removed, such as by wiping, blotting or any other means which is appropriate to remove excess fluid. Another method of application is by passing the web material between transfer coating rollers or spray apparatus in which the release fluid is added. Also, the web can be passed through a bath of the release fluid and then passed through calendering rollers to press the fluid in. In each of these instances, heat may be added to the fluid or to the web in order to facilitate the filling of the voids of the ePTFE membrane with the release fluid. Any type of release agent may be used, such as silicone fluid, hydrocarbon fluids, alcohols, functionalized silicone fluids, water and others. The preferred release fluid for most printer applications is dimethylsiloxane fluid, or silicone oil.

The release agent web assembly may comprise any configuration which is desirable to achieve delivery of release agent from the web to at least one contact surface of the printer device. For example, the release agent web is typically positioned so as to continually provide a clean web surface to the contact surface of the fuser. The assembly may comprise one or more rotating members in order to meet this need. In a preferred embodiment of the present invention, the release agent web assembly comprises at least two rotating members which permit the web and the contact surface to move relative to each other.

Figure 4:
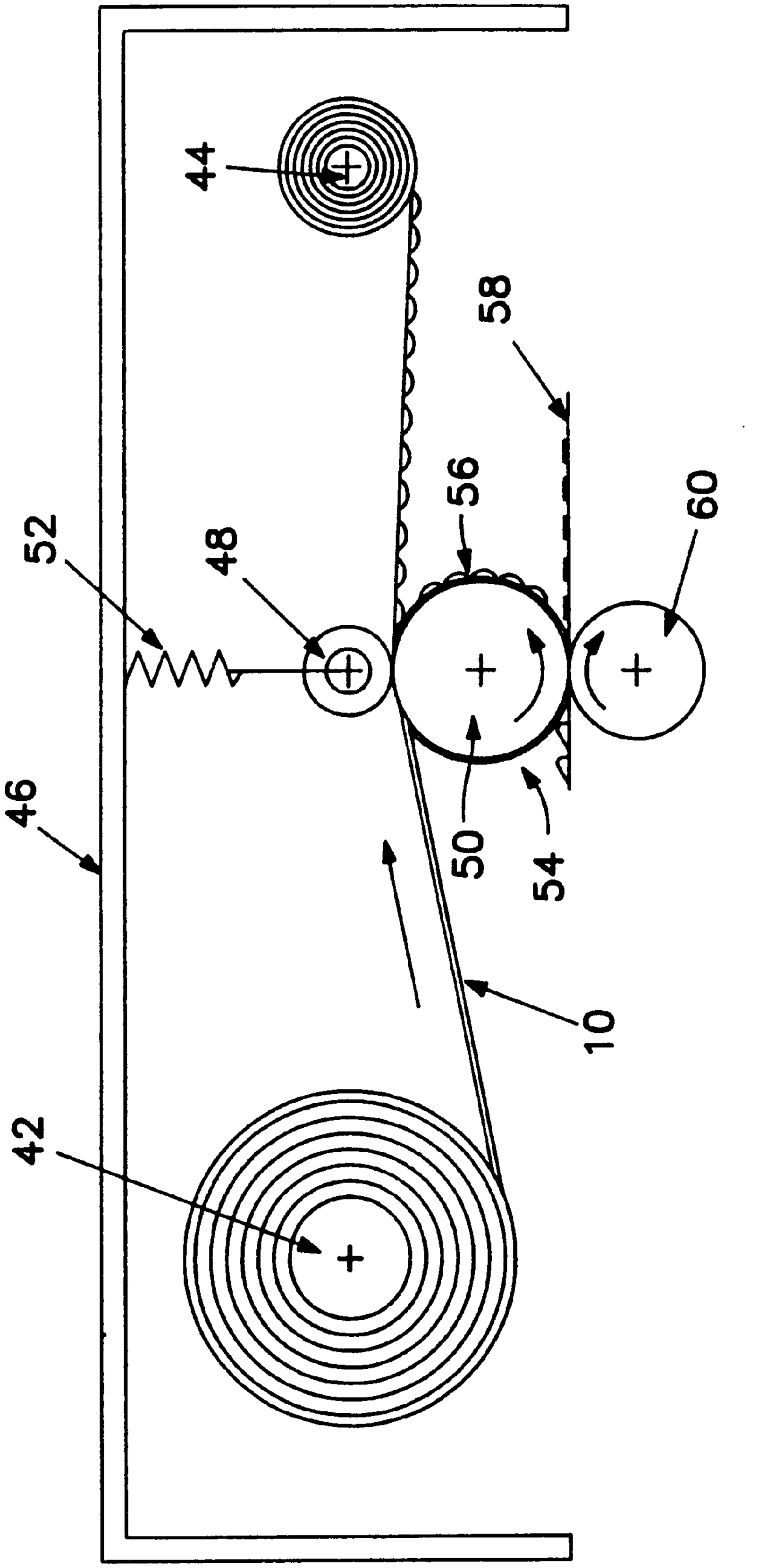
FIG. 4 is a side elevation view of the web material of the present invention in contact with a fuser member.

Shown in FIG. 4 is one apparatus for applying release fluid in a printer by employing a web 10 of the present invention. This apparatus comprises a payoff shaft 42, a takeup shaft 44, a housing or frame 46, and an elastomeric roller or member 48 that can apply pressure to hold the web 10 to a fuser roller 50. Preferably, the elastomeric member 48 is spring loaded or includes some other form of mechanical biasing device 52 to maintain contact with the fixation roller 50. Cut to the correct operating size, the oiled web material 10 is preferably mechanically attached or adhesively bonded (hereafter collectively referred to as "attached") to both the payoff shaft 42 and the takeup shaft 44, with the web initially wound on the payoff shaft upon installation and then steadily transferred to the takeup shaft during operation. Once the web 10 is completely transferred to the takeup shaft, the web assembly (i.e., the web 10 and both shafts 42, 44) can then be replaced. Alternatively, the web assembly may include the entire apparatus mounted on the frame 46, which can be replaced as a whole each time the web must be replaced.

Where the web is attached by adhesive to the shafts 42, 44, a variety of adhesives can be used to bond the web to the shaft, including silicone rubber, acrylic, polyester, epoxy, pressure sensitive adhesive, and urethanes. Alternatively, the web 10 may be attached by clips, slots, or other mechanical devices to one or both of the two shafts.

In the apparatus described, the web 10 is ideally automatically indexed past the fixation roller 50 as the printer is used. The oil is pulled out of the clean or fresh portion of the web where it is in contact with the fuser roller 50 and in order to keep the fuser lubricated properly. The elastomeric roller or member 48 pushes down on the web 10 and presses the web against the fuser roller 50. This transfers a layer of oil 54 onto the fuser roller 50. Simultaneously, contaminates (e.g., dirt and toner particles) 56 on the fuser roller 50 are transferred onto the web 10 where it contacts the fuser 50.

In this manner, a fresh release coating 54 is supplied on the fuser roller 50 to protect against adhesion of paper and toner 58 to the fuser roller 50 during the fixing process as the paper 58 passes between the fuser roller 50 and a pressure roller 60. Further, toner particles 56 adhered to the fuser roller are cleaned off as the roller passes the web 10. The regular indexing of the web 10 assures that a fresh supply of oil and a clean web surface is always supplied.

Figure 7:
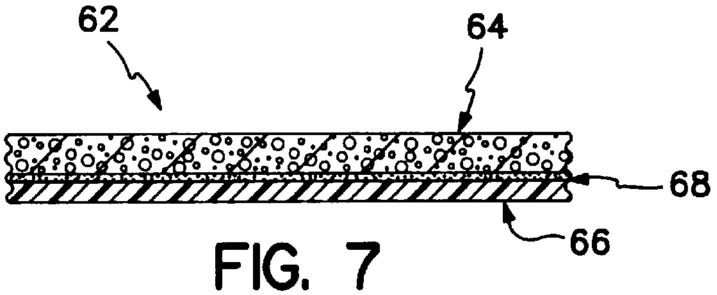
FIG. 7 is an enlarged cross-section view of another embodiment of a web of the present invention.

Another embodiment of the web material of the present invention is depicted in FIG. 7. The web material 62 comprises an ePTFE membrane 64 bonded to a substrate 66 of a spunbonded nonwoven polyester. The membrane 64 and the substrate 66 are adhered together along layer 68, comprising the polyester layer 66 melted and flowed into and around the nodes and fibrils of the ePTFE membrane 64. When the polyester cools and hardens, the polyester and ePTFE are mechanically adhered together.

Figure 8:
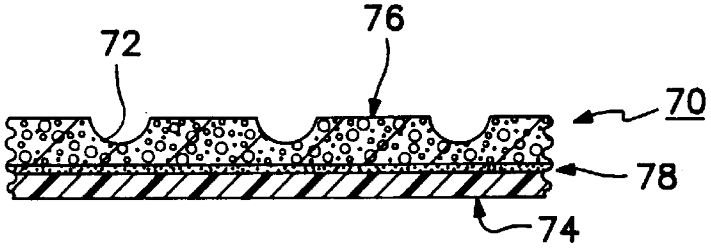
FIG. 8 is an enlarged cross-section view of still another embodiment of a web of the present invention with a densified pattern.

Still another embodiment of the web material of the present invention is depicted in FIG. 8. In this instance, the web material 70 includes a densified pattern 72 therein. The substrate material 74 is a polyester film material which is impermeable to fluids. The substrate material 74, is bonded to ePTFE membrane 76 using an adhesive 78. The adhesive 78 chemically bonds to the substrate material 74 and mechanically bonds to the ePTFE membrane 76.

Figure 9:
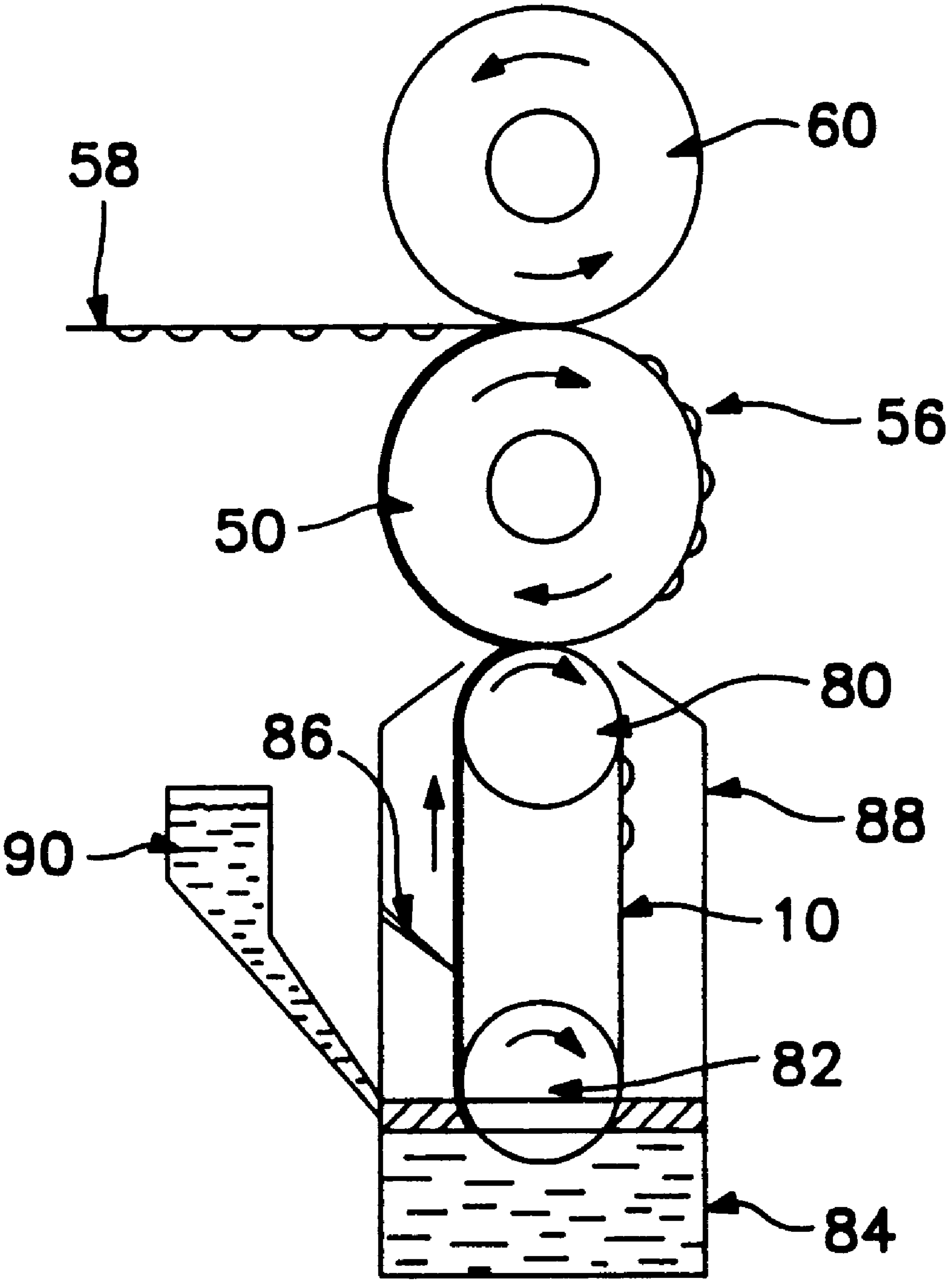
FIG. 9 is a side view of the web material of the present invention in contact with a fuser member.

FIG. 9 is a cross-section view of still another embodiment of an endless belt or web 10 of the present invention. The web is wound around two rollers 80 and 82, that keep the appropriate tension on the web belt. The web in this case rotates in the opposite direction to the fixation roller 50. Pressure roller 60 and paper 58 are disposed as is shown in FIG. 4. A cleaning blade 86 is mounted to housing 88. The cleaning blade 86 ensures that the web is free of contamination before the web contacts the fuser. In addition, the blade 86 helps to meter the amount of oil on the web as it moves to the fuser. A reservoir 84 of oil is provided through which the belt 10 regularly passes to regenerate the clean web and assure that it maintains a correct amount of oil thereon. An automatic filling bottle 90 is provided that only allows the fluid to come out if the fluid level gets low enough to allow air to displace the fluid within the bottle.

One of the chief advantages of the present invention is that it provides a much higher rate of consistent release agent delivery than has been previously possible. Previous oiling webs constructed from NOMEX® felts could deliver only up to 0.5 mg/page of oil on a consistent basis. By contrast, the web made in accordance with the present invention can readily deliver a consistent rate of release agent at or above 0.5 mg/page. In fact, release agent delivery has been achieved at a consistent rate at or above 8 mg/page and up to 13 mg/page and above.

Moreover, another significant advantage of the present invention is the use of a suitable adhesive to bond the ePTFE membrane to a substrate. For example, as mentioned earlier herein, by providing the adhesive in a discontinuous pattern, thermal expansion and/or shrinkage stresses between and/or within the bonded layers may be significantly minimized.

Figure 11:
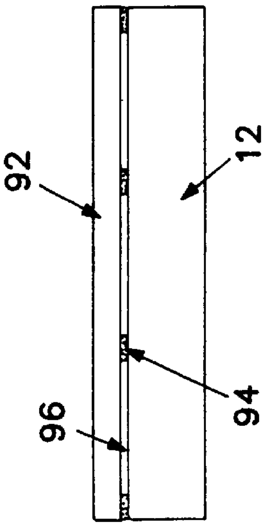
FIG. 11 is an enlarged cross-section view of the web material used in the present invention having a gravure print adhesive pattern.
Figure 12:
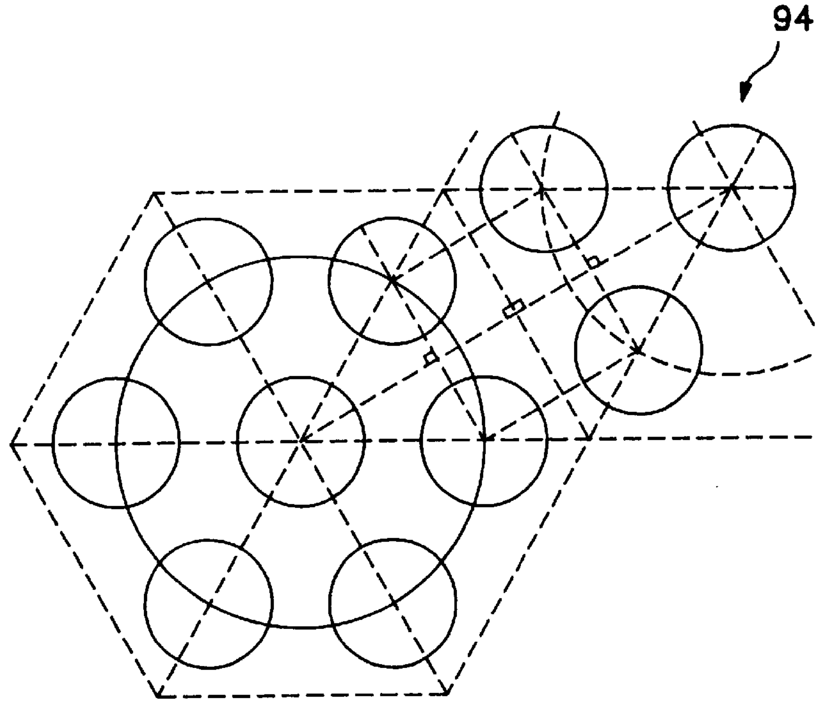
FIG. 12 is a top plane view of a 45° gravure pattern.
Figure 13:
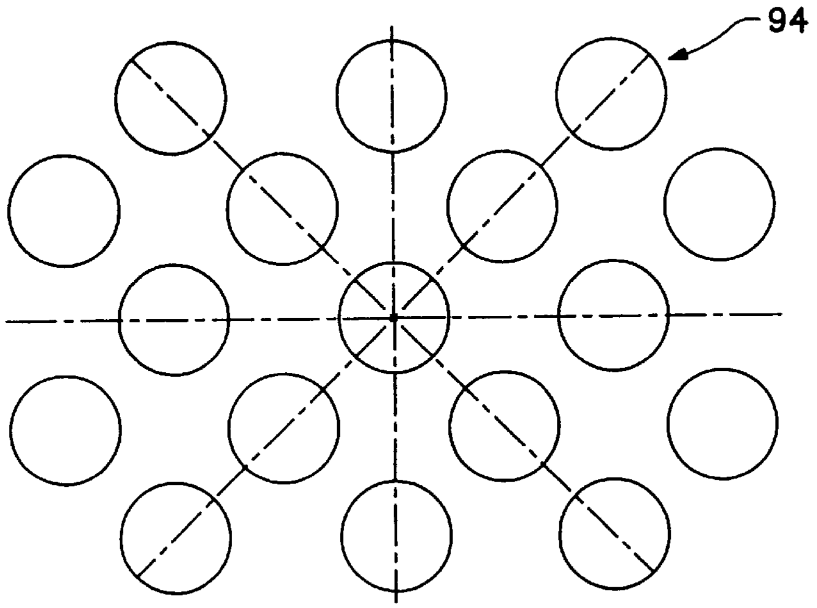
FIG. 13 is a top plane view of a rosette gravure pattern.

As depicted in FIG. 11, application of a discontinuous pattern comprising a gravure printed adhesive between the microporous membrane 12 and a continuous film backing 92 provides areas of adhesive dots 94 and areas of non-adhesion 96. The adhesive dots 94 can be placed in numerous configurations—two of which are displayed schematically in FIGS. 12 and 13. When the composite of the present invention is subjected to a normal fusing temperature, such as, for example, 150–250° C., the layers of the composite may shrink to varying degrees. In instances where the microporous membrane 12 shrinks to a greater degree than the continuous film backing 92, a tension gradient is built up between the layers. If the adhesive is discontinuously printed into, for example, discrete dots 94, the tension may be localized and controlled between the adhesive dots.

Figure 14:
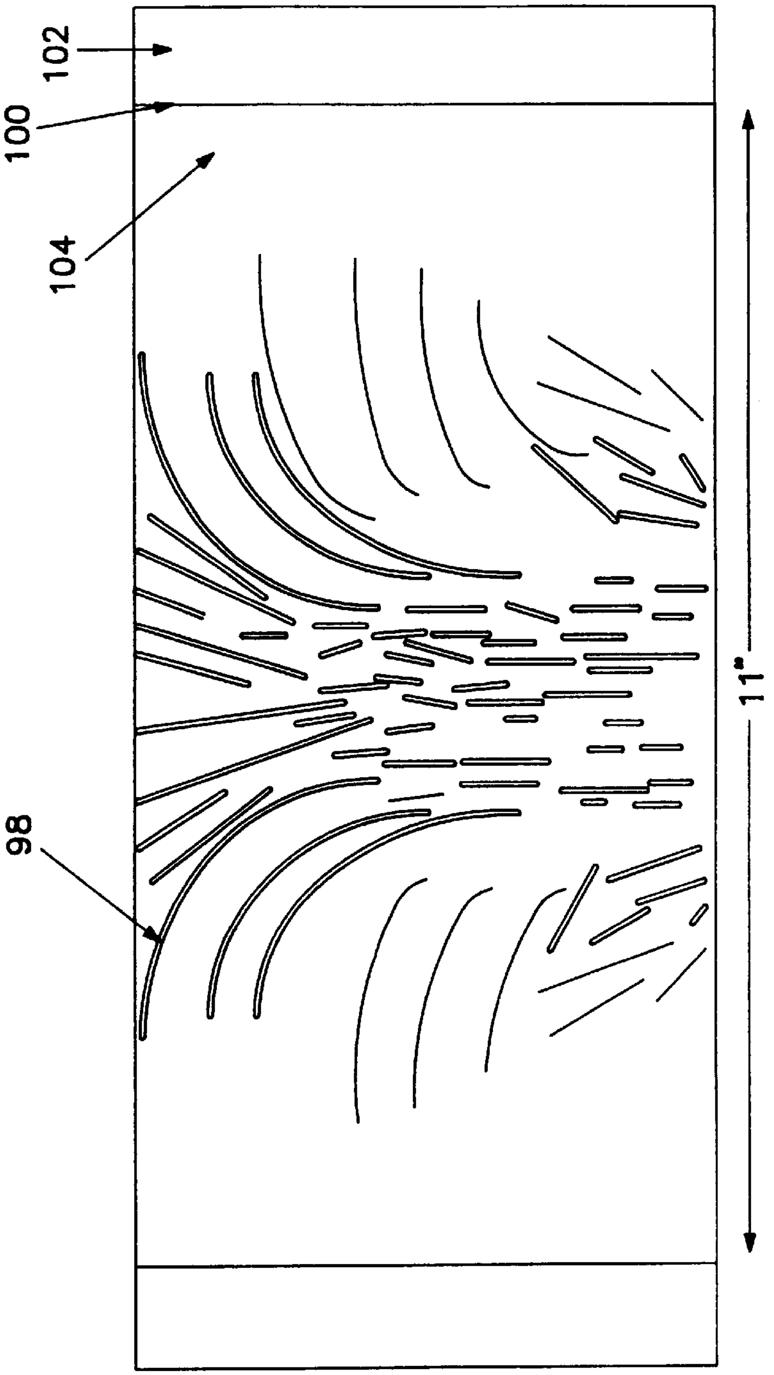
FIG. 14 is a top plane view, microporous membrane up, of the web material with continuous adhesive from Example 5.

In contrast, if the adhesive is provided as a continuous film, then the tension is no longer localized, but rather is distributed across the entire web. As displayed in FIG. 14, wrinkles 98 form in the machine direction when the continuous film backing 92 buckles around the microporous membrane 12. As a result, the contact area between the membrane and the fuser roller may be decreased and irregular, thus dramatically increasing tracking and rewind problems. The transition zone 100 between the saturated 102 and unsaturated 104 sections on the used portion of the web mirrors the paper edge on the fuser roller.

Without intending to limit the scope of the present invention, the following examples illustrate how the present invention may be made and used:

EXAMPLE 1

An expanded PTFE membrane (thickness 0.008" (0.20 mm), bubble point 13.6) from W. L. Gore & Associates, Inc., Elkton, Md., was adhered to a solid 0.001" (0.0254) mm thick polyethylene naphthalate (PEN) film, Kaladex® 2000 from ICI Films, Wilmington, De., through a lamination procedure. The adhesive, 1081–4104 from GE silicones, Waterford, N.Y., was applied to the PEN film with a chrome roller in counter-current contact with a smooth silicone roller in counter-current contact with an offset gravure roller rotating at 3–4 ft/min (1–1.3 m/min). The film then contacted the membrane under a nip roller. The lab line moved at 1.6–1.7 ft/min (48–50 cm/min) through a 15' (4.5 m) IR oven at 130–140° C.

The material was slit to 12" (30 cm) width and placed on to two 12.3" (31 cm) long, 0.40" (1.0 cm) diameter aluminum shafts with DEV-7163 pressure sensitive adhesive from Adhesives Research, Inc., Glen Rock, Pa. The material was then saturated with 500 cst 200® Fluid, Dow Corning Corporation, Midland, Mich., by wiping an excess amount onto the membrane surface and allowing the fluid to fully permeate the membrane. Any excess fluid was wiped off until the membrane surface retained no shine. The achieved web material had the following characteristics: 77% oil volume/web volume, 0.008" (0.20 mm) thickness, 132 g/m$^2$ oil/web area, and 654 kg/m$^2$ oil/web volume.

The web was assembled into a XEROX® Model 5028 web cartridge and placed into a Model 5028 copier, Xerox Corporation, Rochester, N.Y. The oil rate on a per page basis was determined by Inductively Coupled Plasma (ICP) analysis. Samples were taken every 500 copies with the following sampling scheme: The copier ran 3 then 97 copies for the set of 100 from which three data points were obtained. Then the rest of the sets of 100 were run at 1 then 99 copies. The dwell time between sets was limited to the electronic reset rate of the 5028 copy machine. A transfer efficiency of 61.4% was calculated based on the following measurements.

| Page | Oil/Page (mg) |
|---|---|
| 1 | 10.992 |
| 2 | 3.357 |
| 3 | 2.618 |
| 501 | 4.833 |
| 502 | 2.524 |
| 503 | 2.802 |
| 1001 | 4.365 |
| 1002 | 2.939 |
| 1003 | 2.529 |
| 1501 | 2.087 |
| 1502 | 1.661 |
| 1503 | 1.430 |
| 2001 | 2.314 |
| 2002 | 1.747 |
| 2003 | 1.552 |

EXAMPLE 2

An expanded PTFE membrane (thickness 0.0035" (0.09 mm), bubble point 18) from W. L. Gore & Associates, Inc., Elkton, Md., was laminated to a polyester-NOMEX nonwoven, 141–0052 from Veratec, Athens, Ga. Lamination occurred at the following conditions: 15 psi (1.05 kg/cm$^2$) pinch, 12 ft/min (3.6 m/min), 370° F. (188° C.)

The material was slit to 12" width and placed onto two 12.3" (31 cm) long, 0.40" (1.0 cm) diameter aluminum shafts with DEV-7163 pressure sensitive adhesive from Adhesives Research, Inc., Glen Rock, Pa. The material was then saturated with 500 cst 200® Fluid, Dow Corning Corporation, Midland, Mich., by wiping an excess amount onto the membrane surface and allowing the fluid to fully permeate the membrane. Any excess fluid was wiped off until the membrane surface retained no shine. The achieved web material had the following characteristics: 67% oil volume/web volume, 0.0052" (0.132 mm) thickness, 87 g/m$^2$ oil/web area, and 653 kg/m$^2$ oil/web volume.

The web was assembled into a Model 5028 web cartridge and placed into a Model 5028 copier, Xerox Corporation, Rochester, N.Y. The oil rate on a per page basis was determined by Inductivety Coupled Plasma (ICP) analysis. Samples were taken every 500 copies with the following sampling scheme: The copier ran 3 then 97 copies for the set of 100 from which three data points were obtained. Then rest of the sets of 100 were run at 1 then 99 copies. The dwell time between sets was limited to the electronic reset rate of the 5028 copy machine. A transfer efficiency of 94.9% was calculated based on the following measurements.

| Page | Oil/Page (mg) |
|---|---|
| 1 | 63.336 |
| 2 | 15.296 |
| 3 | 9.811 |
| 501 | 3.605 |
| 502 | 2.736 |
| 503 | 2.472 |
| 1001 | 3.969 |
| 1002 | 2.909 |

-continued

| Page | Oil/Page (mg) |
|---|---|
| 1003 | 2.640 |
| 1501 | 4.250 |
| 1502 | 2.520 |
| 1503 | 2.184 |
| 2001 | 5.294 |
| 2002 | 3.119 |
| 2003 | 2.640 |

EXAMPLE 3

A membrane (thickness 0.008" (0.20 mm), bubble point 13.6) from W. L. Gore & Associates, Elkton, Md., was adhered to a solid 0.001" (0.025 mm) thick polyethylene naphthalate (PEN) film, Kaladex® 2000 from ICI Films, Wilmington, De., through a laminator procedure. The adhesive, 1081–4104 from GE silicones, Waterford, N.Y., was applied to the PEN film with a chrome roller in counter-current contact with a smooth silicone roller in counter-current contact with an offset gravure roller rotating at 3–4 fpm (1–1.3 m/min). The film then contacted the membrane under a nip roller. The lab line moved at 1.6–1.7 fpm (48–50 cm/min) through a 15' (4.5 m) IR oven at 130–140° C.

The material was slit to 12" (30 cm) width and placed onto two 12.3" (31 cm) long, 0.40" (1.0 cm) diameter aluminum shafts with DEV-7163 pressure sensitive adhesive from Adhesives Research, Inc., Glen Rock, Pa. The material was then saturated with 50 cst 200® Fluid, Dow Corning Corporation, Midland, Mich., by wiping an excess amount onto the membrane surface and allowing the fluid to fully permeate the membrane. Any excess fluid was wiped off until the membrane surface retained no shine. The achieved web material had the following characteristics: 77% oil volume/web volume, 0.008" (0.2 mm) thickness, 132 g/$m^2$ oil/web area, and 654 kg/$m^2$ oil/web volume.

The web was assembled into a 5028 web cartridge and placed into a 5028 copier, Xerox Corporation, Rochester, N.Y., in which the web index motor (0.1 rpm) was replaced with a 1 rpm motor. The first twenty copies were characterized for oil rate on a per page basis by Inductively Coupled Plasma (ICP) analysis. A transfer efficiency of 30.3% was calculated based upon the following measurements.

| Page | Oil/Page (mg) |
|---|---|
| 1 | 46.890 |
| 2 | 12.470 |
| 3 | 9.922 |
| 4 | 9.315 |
| 5 | 8.989 |
| 6 | 8.641 |
| 7 | 10.190 |
| 8 | 9.959 |
| 9 | 10.220 |
| 11 | 11.490 |
| 12 | 11.570 |
| 13 | 12.850 |
| 14 | 13.770 |
| 15 | 13.530 |
| 16 | 12.610 |
| 17 | 13.600 |
| 18 | 13.940 |

-continued

| Page | Oil/Page (mg) |
|---|---|
| 19 | 14.520 |
| 20 | 13.940 |

As can be seen by this Example, the oiling web of the present invention can provide consistently high rates of oil delivery, this case consistently above 8 mg/page and up to 13 mg/page on a relatively consistent basis. The consistently high rate of oil delivery has not been possible with previous oiling technology.

EXAMPLE 4

Figure 10:
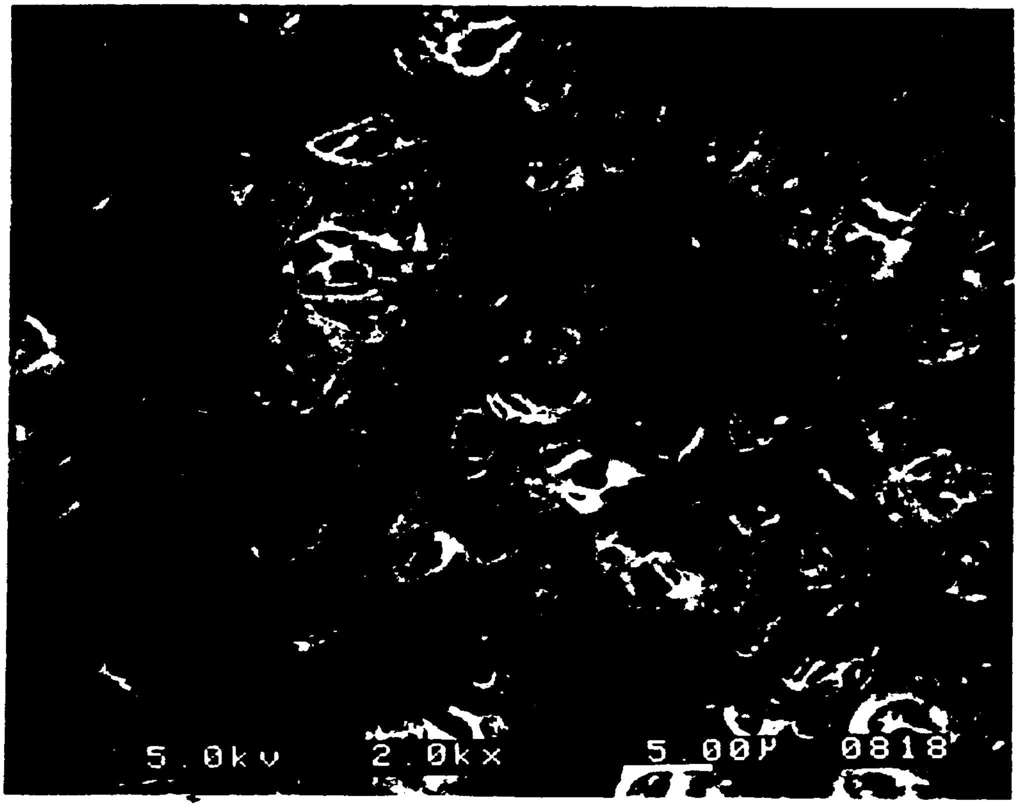
FIG. 10 is a SEM of the microporous material of the present invention per Example 4, enlarged 2,000 times.

A polypropylene membrane (lot number K3329F, 0.2 μm BMF, thickness 0.0045" (0.11 mm)) from 3M, St. Paul, Minn., was adhered to DEV-8026, a 0.001" (0.025 mm) silicone transfer adhesive sandwiched between two polyester release liners from Adhesives Research, Inc., Glen Rock, Pa. An SEM of this polypropylene material is shown in FIG. 10. One of the liners was removed, and a 4" by 4" (10 cm×10 cm) section of the membrane was applied to the adhesive.

The section was then saturated with 50 cst 200® Fluid silicone oil from Dow Corning Corporation, Midland, Mich. The 4" by 4" (10 cm×10 cm) section was placed over a steel bar with a nip width of 0.03125" (0.75 mm) and a nip length of 8.4375" (21 cm). An upward load of 2.485 lb. (1.0 kg) was placed on the steel bar to bring it into contact with a 4.0 inch (8.9 cm) diameter anodized aluminum imaging drum at ambient temperature.

In the first test, the drum was stationary when blotted, and the blots averaged 1.1 mg for a 2 second dwell time. In the second test, the drum was rotated at approximately 30 rpm. The composite metered out a continuous 4" (10 cm) wide section containing 15.7 mg of silicone oil. This yields a film thickness of 9 microinches (0.24 mm).

EXAMPLE 5

An expanded PTFE membrane (thickness 0.0035" (0.09 mm), bubble point 18) form W. L. Gore & Associates, Inc., Elkton, Md., was adhered to a solid 0.001" (0.025 mm) thick polyethylene naphthalate (PEN) film, Kaladex® 2000 from ICI Films, Wilmington, De., through a lab line procedure. The adhesive, 1081–5013 from GE Silicones, Waterford, N.Y., was applied to the PEN film by offset gravure (15% coverage, 130 micron wells) at 3–4 fpm (1–1.3 m/min). The film then contacted the membrane under a nip roller. The composite moved at 1.6–1.7 fpm (48–50 cm/min) through a 15' (4.5 m) IR oven at 130–140° C. The material was then slit to 12" (30 cm) width and placed onto two 12.3" (31 cm) long, 0.40" (1.0 cm) diameter aluminum shafts with DEV-7163 pressure sensitive adhesive from Adhesives Research, Inc., Glen Rock, Pa.

The web was saturated with 350 cst 200® Fluid, Dow Corning Corporation, Midland, Mich., by wiping an excess amount onto the membrane surface and allowing the fluid to fully permeate the membrane. Any excess fluid was wiped off until the membrane surface retained no shine. The achieve web material had the following characteristics with a 95% confidence interval: 0.86±0.03 cc oil/cc web, 0.0049±0.0002" (0.12±0.005 mm) thickness, 83±4 g oil/$m^2$ web, and 670±21 kg oil/$m^3$ web. The web was assembled into a 5028 cartridge and placed into a 5028 copier, Xerox Corporatin, Rochester, N.Y. The web count was set to zero and nineteen samples (every 50th page after the first 100) were taken out of the 1000 page run and characterized for oil rate on a per page basis by Inductively Coupled Plasma (ICP) analysis. A transfer efficiency of 87.6% was calculated based upon the following measurements.

| Page Number | Oil per Page (mg) |
|---|---|
| 100 | 2.270 |
| 150 | 2.688 |
| 200 | 2.694 |
| 250 | 2.782 |
| 300 | 2.687 |
| 350 | 2.574 |
| 400 | 3.294 |
| 450 | 3.778 |
| 500 | 3.188 |
| 550 | 2.984 |
| 600 | 3.109 |
| 650 | 2.700 |
| 700 | 3.088 |
| 750 | 2.416 |
| 800 | 2.396 |
| 850 | 3.113 |
| 900 | 2.527 |
| 950 | 2.708 |
| 1000 | 2.482 |

The area of the web that was run through the copier was then measured for thickness variations. Measurements were taken throughout the center section and along the unsaturated paper edge of the oil transition zone.

| Center (mil) | Edge (mil) |
|---|---|
| 6.1 | 2.7 |
| 4.3 | 2.6 |
| 6.5 | 2.6 |
| 4.4 | 2.6 |
| 4.5 | 2.7 |
| 6.8 | 2.8 |
| 4.6 | 2.7 |
| 7.1 | 2.7 |

These results were then compared to the same material with a gravure printed adhesive. An expanded PTFE membrane (thickness 0.0035" (0.09 mm), bubble point 18) from W. L. Gore & Associates, Inc., Elkton, Md., was adhered to a solid 0.001" (0.025 mm) thick polyethylene naphthalate (PEN) film, Kaladex® 2000 from ICI Films, Wilmington, Del., through a lab line procedure. The adhesive, 08-211-3 from Performance Coatings Corporation, Levittown, Pa., was applied to the PEN film with a gravure roller (15% coverage, 130 micron wills) rotating at 30 fpm (10 m/min). The film then contacted the membrane under a nip roller. With the membrane side toward a 12" (30 cm) wide, 300 watt, mercury UV lamp, the adhesive was cured at 30 fpm (10 m/min). The material was slit to 12" (30 cm) width and placed onto two 12.3" (31 cm) long, 0.40" (1.0 cm) diameter aluminum shafts with DEV-7163 pressure sensitive adhesive from Adhesives Research, Inc., Glen Rock, Pa.

The material was then saturated with 350 cst 200® Fluid, Dow Corning Corporation, Midland, Mich., by wiping an excess amount onto the membrane surface and allowing the fluid to fully permeate the membrane. Any excess fluid was wiped off until the membrane surface retained no shine. The achieved web material had the following characteristics with a 95% confidence interval: 0.81±5 cc oil/cc web, 0.0044±0.0003" (0.11+0.008 mm) thickness, 68±4 g oil/$m^2$ web, and 606±28 kg oil/$m^3$ web. The web was assembled into a 5028 web cartridge and placed into a 5028 copier, Xerox Corporation, Rochester, N.Y. The web count was set to zero and nineteen samples (every 50th page after the first 100) were taken out of the 1000 page run and characterized for oil rate on a per page basis by Inductively Coupled Plasma (ICP) analysis.

| Page Number | Oil per Page (mg) |
|---|---|
| 100 | 1.938 |
| 150 | 2.393 |
| 200 | 2.343 |
| 250 | 1.991 |
| 300 | 2.270 |
| 350 | 2.064 |
| 400 | 2.418 |
| 450 | 2.476 |
| 500 | 2.308 |
| 550 | 2.012 |
| 600 | 2.375 |
| 650 | 2.441 |
| 700 | 2.179 |
| 750 | 2.541 |
| 800 | 2.129 |
| 850 | 2.248 |
| 900 | 2.280 |
| 950 | 2.406 |
| 1000 | 2.193 |

The area of the web that was run through the copier was then measured for thickness variations. Measurements were taken throughout the center section and along the unsaturated paper edge of the oil transition zone.

| Center (mil) | Edge (mil) |
|---|---|
| 2.7 | 3.3 |
| 2.6 | 3.2 |
| 2.8 | 3.2 |
| 2.7 | 3.1 |
| 2.9 | 3.2 |
| 2.7 | 3.0 |
| 2.6 | 3.4 |
| 2.5 | 3.3 |

The oil transfer efficiency of the continuous adhesive composite within a 95% confidence level was 91.0%±5.8%. The oil transfer efficiency of the gravure printed adhesive composite was 89.3%±3.3%. Within a 95% confidence level, no significant difference exists in the overall efficiencies. However, as demonstrated by the large variation between center and edge thickness measurements for the continuous film composite, a dramatic difference exists in the operating performance. The numerous 0.015 to 0.0045" (0.38 to 0.114 mm) deep ridges present in the continuous film adhesive composite are not present in the gravure printed adhesive composite. These ridges, which appear to result from the uncontrolled tension gradient between the microporous membrane and the continuous film backing, dramatically increase take-up diameter and tracking problems.

COMPARATIVE EXAMPLE

A non-woven aramid web, Part #600K47140 (Xerox Corporation, Rochester, N.Y.) had the following characteristics: 0.076±0.0076 mm thickness and 31±2 g oil /$m^2$ web. The web was assembled into a 5028 web cartridge and placed into a 5028 copier (Xerox Corporation, Rochester, N.Y.). The web count was set to zero and nineteen samples (every 50th page after the first 100) were taken out of the 1000 page run and characterized for oil rate on a per page basis by Inductively Coupled Plasma (ICP) analysis.

| Page Number | Oil per Page (mg) |
|---|---|
| 50 | 0.551 |
| 100 | 0.466 |
| 150 | 0.485 |
| 200 | 0.393 |
| 250 | 0.340 |
| 300 | 0.342 |
| 350 | 0.465 |
| 400 | 0.353 |
| 450 | 0.332 |
| 500 | 0.372 |
| 550 | 0.321 |
| 600 | 0.363 |
| 650 | 0.311 |
| 700 | 0.304 |
| 750 | 0.299 |
| 800 | 0.328 |
| 850 | 0.305 |
| 900 | 0.297 |
| 950 | 0.306 |
| 1000 | 0.344 |

The transfer efficiency was calculated to be 30.3%.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A release agent web assembly adapted for mounting in a printer device having at least one contact surface, that comprises:

an expanded polytetrafluoroethylene (PTFE) membrane filled with a release agent;

a substrate material attached to the expanded PTFE membrane;

the expanded PTFE and substrate material comprising an elongated web of material positioned so as to place the web into contact with the contact surface; and wherein the web assembly is adapted to advance the web to move an unused portion of the web into contact with the contact surface.

2. The release agent web assembly adapted for mounting in a printer device of claim 1 wherein the expanded PTFE material includes a densified pattern therein.

3. The release agent web assembly adapted for mounting in a printer device of claim 1 wherein the contact surface comprises a fuser roller.

4. The release agent web assembly adapted for mounting in a printer device of claim 3 that includes a roller mounted to press the web into contact with the fuser roller.

5. The release agent web assembly adapted for mounting in a printer device of claim 1 wherein the expanded PTFE has a porosity of at least 50%.

6. The release agent web assembly adapted for mounting in a printer device of claim 3 wherein release agent is delivered at a consistent rate of above 0.5 mg/page.

7. The release agent web assembly adapted for mounting in a printer device of claim 1, wherein release agent is delivered at a consistent rate of above 0.5 mg/page.

8. The release agent web assembly adapted for mounting in a printer device of claim 1, wherein said expanded PTFE membrane further comprises at least one filler.

9. A release agent web assembly adapted for mounting in a printer device employing at least one contact surface, comprising:

a microporous membrane filled with a release agent;

a substrate material attached to the microporous membrane;

the microporous membrane and substrate material comprising an elongated web of material positioned so as to place the web into contact with the contact surface; and wherein the web assembly is adapted to advance the web to move an unused portion of the web into contact with the contact surface.

10. The release agent web assembly adapted for mounting in a printer device of claim 9 wherein the microporous membrane is formed from a material selected from expanded polytetrafluoroethylene and polyolefin.

11. The release agent web assembly adapted for mounting in a printer device of claim 9 wherein the contact surface comprises a fuser roller.

12. The release agent web assembly adapted for mounting in a printer device of claim 11 wherein release agent is delivered at a consistent rate of above 0.5 mg/page.

13. The release agent web assembly adapted for mounting in a printer device of claim 9 wherein release agent is delivered at a consistent rate of above 0.5 mg/page.

14. The release agent web assembly adapted for mounting in a printer device of claim 11, wherein said substrate material comprises a material selected from the group consisting of polyester, polyamide polyimide, polyethylene napthalate (PEN), polytetrafluoroethylene (PTFE), perfluoroalkoxy (PFA) and fluorinated ethylene propylene (FEP).

15. The release agent web assembly adapted for mounting in a printer device of claim 1, wherein said elongated web of material comprises a flexible material.

16. The release agent web assembly adapted for mounting in a printer device of claim 1, wherein said substrate material is attached to said expanded PTFE membrane by a curable adhesive.

17. The release agent web assembly adapted for mounting in a printer device of claim 16, wherein said curable adhesive is present in a gravure printed pattern within said assembly.

18. The release agent web assembly adapted for mounting in a printer device of claim 16, wherein said curable adhesive is curable by UV energy.

19. The release agent web assembly adapted for mounting in a printer device of claim 18, wherein said curable adhesive is present in a gravure printed pattern within said assembly.

20. The release agent web assembly adapted for mounting in a printer device of claim 18, wherein said substrate material comprises at least one flexible polyethylene napthalate (PEN) material.

21. The release agent web assembly adapted for mounting in a printer device of claim 9, wherein said elongated web of material comprises a flexible material.

22. The release agent web assembly adapted for mounting in a printer device of claim 9, wherein said substrate material is attached to said expanded PTFE membrane by a curable adhesive.

23. The release agent web assembly adapted for mounting in a printer device of claim 22, wherein said curable adhesive is present in a gravure printed pattern within said assembly.

24. The release agent web assembly adapted for mounting in a printer device of claim 22, wherein said curable adhesive is curable by UV energy.

25. The release agent web assembly adapted for mounting in a printer device of claim 24, wherein said curable adhesive is present in a gravure printed pattern within said assembly.

26. The release agent web assembly adapted for mounting in a printer device of claim 24, wherein said substrate material comprises at least one flexible polyethylene napthalate (PEN) material.

27. A release agent web assembly adapted for mounting in a printer device having at least one contact surface, said assembly comprising:

an expanded polytetrafluoroethylene (PTFE) membrane filled with a release agent;

a substrate material attached to the expanded PTFE membrane by an adhesive which is present in a discontinuous pattern between said substrate and said PTFE membrane;

the expanded PTFE and substrate material comprising an elongated web of material positioned so as to place the web into contact with the contact surface; and wherein the web assembly is adapted to advance the web to move an unused portion of the web into contact with the contact surface.

28. A release agent web assembly adapted for mounting in a printer device having at least one contact surface, said assembly comprising:

an expanded polytetrafluoroethylene (PTFE) membrane filled with a release agent;

a substrate comprising a flexible polyethylene napthalate (PEN) material attached to the expanded PTFE membrane by an adhesive which is present in a gravure printed pattern between said substrate and said PTFE membrane;

the expanded PTFE and substrate material comprising an elongated web of material positioned so as to place the web into contact with the contact surface; and wherein the web assembly is adapted to advance the web to move an unused portion of the web into contact with the contact surface.

29. The release agent web assembly adapted for mounting in a printer device of claim 28, wherein the expanded PTFE material includes a densified pattern therein.

30. The release agent web assembly adapted for mounting in a printer device of claim 28 wherein the contact surface comprises a fuser roller.

31. The release agent web assembly adapted for mounting in a printer device of claim 30 that includes a roller mounted to press the web into contact with the fuser roller.

32. The release agent web assembly adapted for mounting in a printer device of claim 28 wherein the expanded PTFE has a porosity of at least 50%.

33. The release agent web assembly adapted for mounting in a printer device of claim 29 wherein release agent is delivered at a consistent rate of about 0.5 mg/page to about 5 mg/page.

34. The release agent web assembly adapted for mounting in a printer device of claim 28 wherein release agent is delivered at a consistent rate of about 0.5 mg/page to about 5 mg/page.

35. The release agent web assembly adapted for mounting in a printer device of claim 28, wherein said adhesive comprises a curable adhesive.

36. The release agent web assembly adapted for mounting in a printer device of claim 35, wherein said curable adhesive is curable by UV energy.

37. The release agent web assembly adapted for mounting in a printer device of claim 28, wherein said elongated web comprises a flexible material.

38. A method of forming a release agent web assembly adapted for mounting in a printer device having at least one contact surface, said method comprising:

at least partially filling an expanded polytetrafluoroethylene (PTFE) membrane with a release agent;

attaching a substrate material to said expanded PTFE material, thereby forming an elongated web of material;

juxtaposing the elongated web relative to the printer device so as to allow the web to contact at least one contact surface, whereby the web and the contact surface move relative to each other in order to transfer contaminates on the contact surface to the web and release agent on the web to the contact surface;

and further whereby the web assembly is adapted to advance the web to move an unused portion of the web into contact with the contact surface.

39. The method of claim 37, further comprising providing at least one adhesive in a discontinuous pattern between said expanded PTFE membrane and said substrate material.

40. The method of claim 38, wherein said at least one adhesive comprises a curable adhesive.

41. The method of claim 39, wherein said curable adhesive is cured by supplying UV energy to said adhesive.

42. The method of claim 38, further comprising selectively densifying at least a portion of said PTFE membrane, thereby forming a pattern therein.

43. The method of claim 38, wherein said PTFE membrane has a porosity of at least 50%.

44. The method of claim 38, wherein said substrate material comprises at least one flexible polyethylene napthalate (PEN) material.

45. A method of using the release agent web assembly of claim 1 which is adapted for mounting in a printer device having at least one contact surface, said method comprising:

providing a release agent web assembly, comprising an elongated web of material attached between at least two rotating members, in contact with at least one contact surface of a printer device;

moving said elongated web relative to said contact surface to transfer contaminates from said contact surface to said web and to expose sequential portions of clean web to said contact surface, thereby transferring release agent to said contact surface at a consistent rate of above 0.5 mg/page for a 1000 page run.

46. The method of claim 45, wherein said contact surface comprises a fuser roller.

47. The method of claim 45, wherein said release agent is transferred to said contact surface at a consistent rate of above 2 mg/page for a 1000 page run.

48. The method of claim 45, wherein said release agent is transferred to said contact surface at above 8 mg/page for a 1000 page run.

49. The release agent web assembly adapted for mounting in a printer device of claim 3 that includes a roller mounted to press the web into contact with the fuser roller.

50. The release agent web assembly adapted for mounting in a printer device of claim 1, wherein said elongated web of material is attached between at least two rotating members.

51. The release agent web assembly adapted for mounting in a printer device of claim 9, wherein said elongated web of material is attached between at least two rotating members.

52. The release agent web assembly adapted for mounting in a printer device of claim 27, wherein said elongated web of material is attached between at least two rotating members.

53. The release agent web assembly adapted for mounting in a printer device of claim 28, wherein said elongated web of material is attached between at least two rotating members.

54. The method of claim 38, wherein said elongated web is positioned between two or more rotating members.

* * * * *